No. 661,971. Patented Nov. 20, 1900.
F. W. GARRETT.
CONTROL OF ELECTRIC MOTORS.
(Application filed Mar. 26, 1900.)
(No Model.) 3 Sheets—Sheet 3.

UNITED STATES PATENT OFFICE.

FRANK W. GARRETT, OF JOHNSTOWN, PENNSYLVANIA, ASSIGNOR TO THE LORAIN STEEL COMPANY, OF PENNSYLVANIA.

CONTROL OF ELECTRIC MOTORS.

SPECIFICATION forming part of Letters Patent No. 661,971, dated November 20, 1900.

Application filed March 26, 1900. Serial No. 10,151. (No model.)

*To all whom it may concern:*

Be it known that I, FRANK W. GARRETT, of Johnstown, in the county of Cambria and State of Pennsylvania, have invented a new and useful Improvement in the Control of Electric Motors, of which the following is a full, clear, and exact description, reference being had to the accompanying drawings, which form a part of this specification.

My invention has relation to the control of electric motors, and although not limited thereto is especially applicable to electric-railway motors. On many roads the motor-cars are now provided with four motors and with a controller having two interconnected drums each of which has contacts and connections for controlling the circuit relations of one group of motors and for changing them from series to parallel relation, and vice versa.

My invention is especially applicable to equipments or systems of this general character, although it may be used with three or more groups of motors as well as with two.

The object of my invention is to provide means for controlling motors arranged as above stated in which the motors of each group are changed from series to multiple relation by a series of intermediate steps of a character to gradually accelerate and control their speed without injury thereto, without the interposition of useless resistance, and without at any time entirely opening the circuit therethrough.

Generally considered, my invention consists in a method of series-parallel control applied to a plurality of motors operated in groups, preferably pairs, in which certain of the intermediate circuit changes or steps are effected in one group of motors before the similar changes or steps are effected in the other group or groups, the circuit in one group or groups remaining unbroken, while that of the other group is opened to effect the desired changes. In this manner some of the motors are at all times during the change from series to parallel acting to propel the car.

My invention also consists in a method of series-parallel control possessing certain novel steps and combinations of steps, all as hereinafter described, and pointed out in the appended claims.

Figure 1:
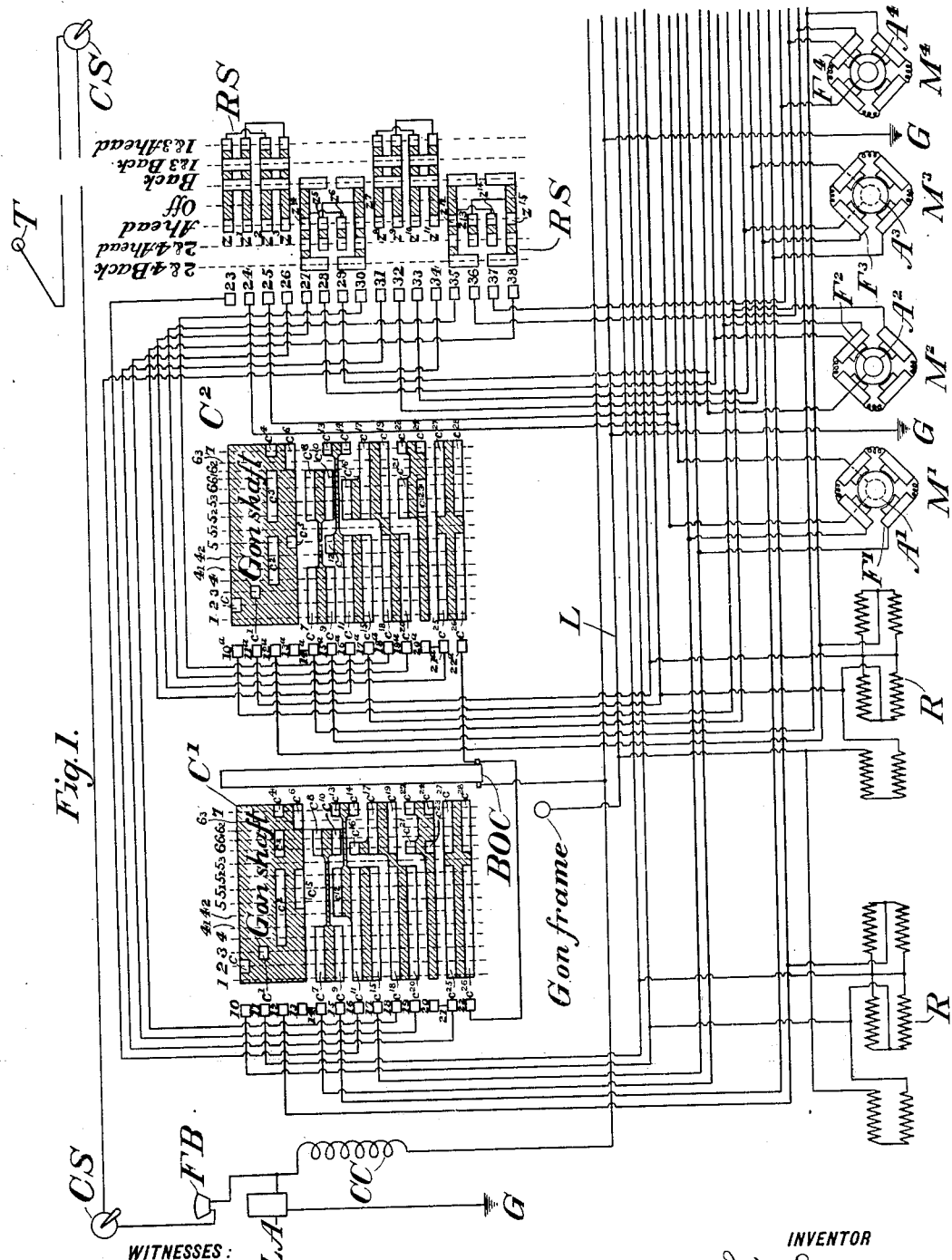
Figure 2:
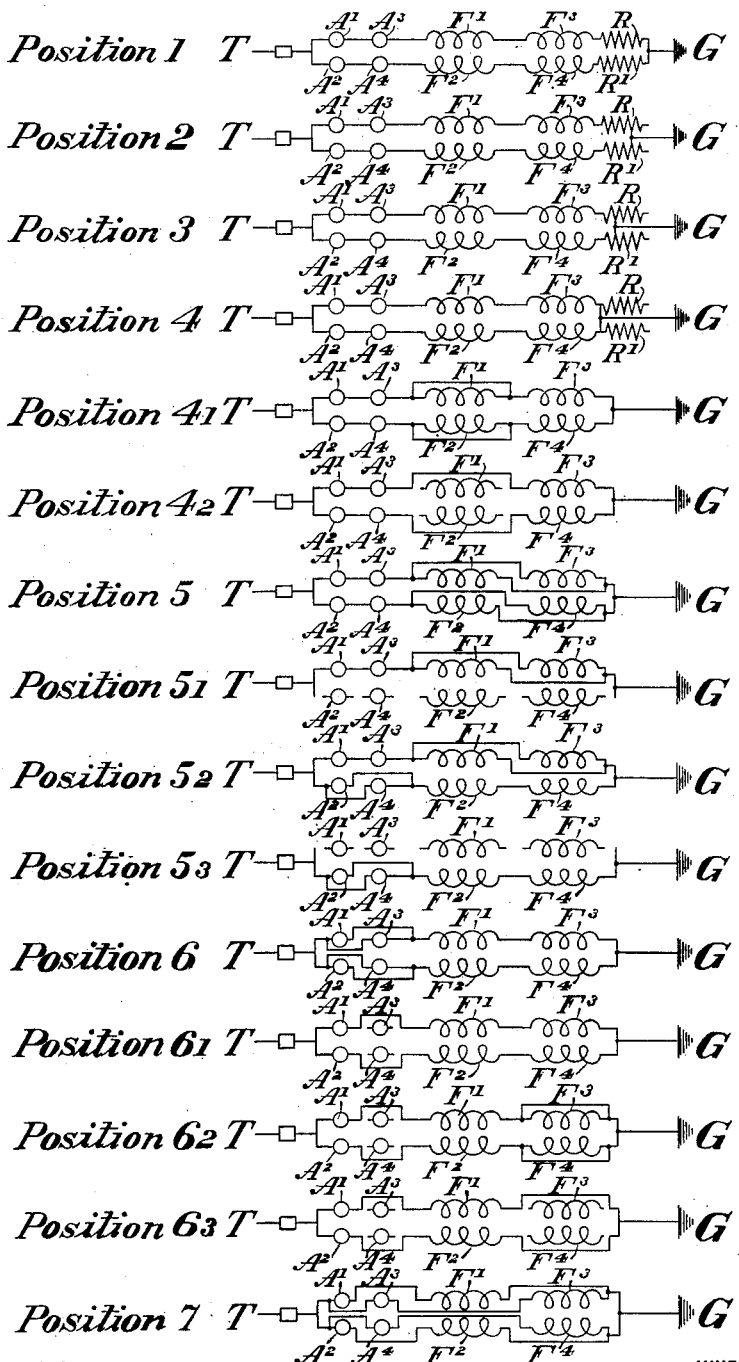
Figure 3:
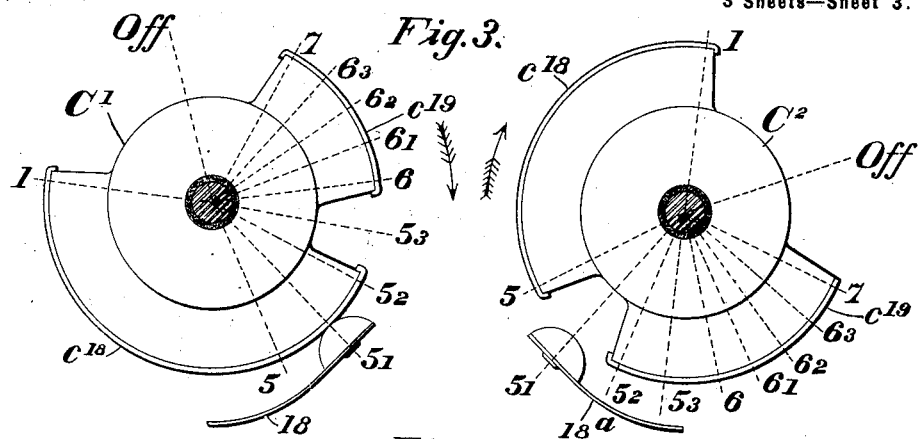
Figure 4:
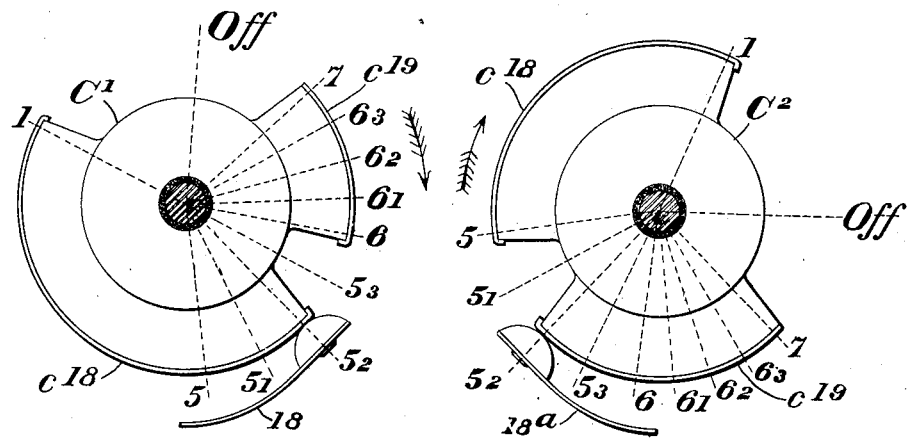
Figure 5:
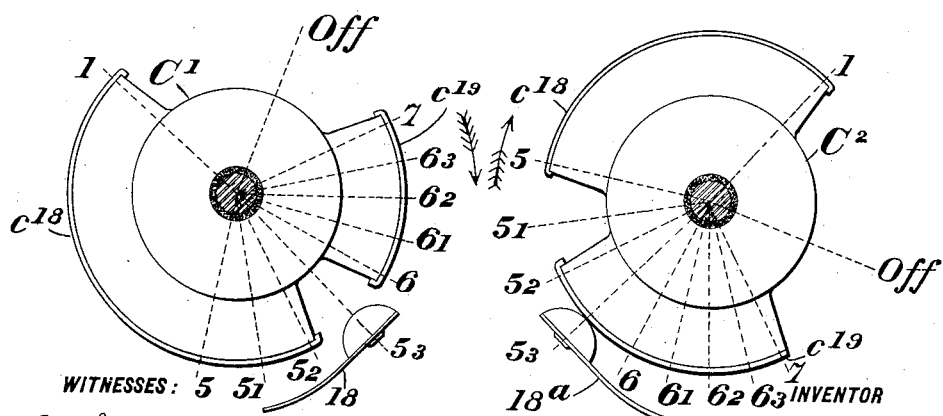

In the accompanying drawings, which illustrate my invention, Figure 1 is a diagram showing a controller developement and circuit arrangement suitable for the practice of my invention. Fig. 2 is a graphic representation of the motor-circuits in the several positions of the controller-drums; and Figs. 3, 4, and 5 are planular sections of the controller-drums, showing the relative positions of their contacts at certain positions of the drums.

In the figures, $M'$, $M^2$, $M^3$, and $M^4$ indicate four electric motors, whose armatures are designated, respectively, as $A'$, $A^2$, $A^3$, and $A^4$ and their field-coils $F'$, $F^2$, $F^3$, and $F^4$. T indicates the connection to the trolley or supply side of the circuit. G wherever seen indicates a ground connection. C S designate the canopy-switches; F B, a fuse-box; L A, a lightning-arrester, and C C a choke-coil. These parts are of any usual character and form no part of my invention.

$C'$ $C^2$ represent in developement the two controller-drums, B o C is the blow-out coil therefor, and R S the reversing-switch.

R R' designate artificial resistance-boxes for connection in circuit with the motors in starting from or approaching a position of rest.

The drums $C'$ $C^2$ in so far as their mechanical arrangement is concerned are of a well-known type, being intergeared with each other in any well-known or usual manner to move in unison by the operation of a single lever or handle.

Each drum $C'$ $C^2$ carries six groups of contacts, the individual contacts of each group being electrically connected with each other, while the several groups are electrically disconnected. The contacts of the first group on each drum are marked $c$ to $c^6$, inclusive; those of the second group, $c^7$ to $c^{10}$, inclusive; those of the third group, $c^{11}$ to $c^{15}$, inclusive; those of the fourth group, $c^{16}$ to $c^{20}$, inclusive; those of the fifth group, $c^{21}$ to $c^{24}$, inclusive, and those of the sixth group, $c^{25}$ to $c^{28}$, inclusive. While the number of contacts is the same on both drums, as is also their general arrangement or grouping, it will be noted that the contacts $c^{11}$, $c^{12}$, $c^{15}$, $c^{18}$, $c^{20}$, $c^{25}$, and $c^{26}$ on the drum C' are longer than the corresponding contacts on the drum $C^2$, in that on the drum $C^2$ these contacts terminate on or slightly beyond the indicated position 5, whereas on the drum C' they extend to a point slightly beyond the dotted line indicating the position $5^2$. It will also be noticed that the contacts $c^3$, $c^8$, $c^{10}$, $c^{16}$, $c^{17}$, $c^{19}$, $c^{21}$, $c^{23}$, $c^{27}$, and $c^{28}$ on the drum $C^2$ are longer than the corresponding contacts on the drum C', being extended farther to the left, so that while on the drum C' these contacts are first engaged when the drum is turned to the position 6 on the drum $C^2$ they are first engaged at the position $5^2$. The contact-fingers which coöperate with the contacts of the drum C' are designated by the numbers 10 to 22, inclusive, while the fingers which coöperate with the contacts of the drum $C^2$ are designated by the reference characters $10^a$ to $22^a$, inclusive.

The reversing-switch R S is of well-known type and need not be described, being shown only for the purpose of completing the electrical connections. In tracing the circuits hereinafter it will be assumed that their series of contact-fingers are engaging the contacts on the dotted line marked "ahead" and designated by $z$ $z'$ $z^2$, &c., to $z^{15}$. Contact-fingers 10, 11, and 12 are electrically connected to the resistance-box R to connect in circuit, respectively, a decreasing amount of the resistance therein, and fingers $10^a$, $11^a$, and $12^a$ are similarly connected to the resistance-box R'. Finger 12 is also connected to one terminal of the field-coil $F^3$, and finger $12^a$ is similarly connected to one terminal of the field-coil $F^4$. Finger 13 is electrically connected to finger 14, and the latter is connected to one terminal of the field-coil F'. Finger $13^a$ is connected to finger $14^a$ and the latter to one terminal of the field-coil $F^2$. Finger 15 is connected to one side of the field-coil $F^3$ and finger $15^a$ to the corresponding side of field-coil $F^4$. Fingers 16 and $16^a$ are respectively connected to armatures $A^3$ and $A^4$ through the reversing-switch, and the return connections from said armatures through said switch are made, respectively, with the fingers 19 and $19^a$. Fingers 17 and $17^a$ are respectively connected to field-coils F' and $F^2$. Fingers 18 and $18^a$ are respectively connected to armatures A' and $A^2$, the return connections also through said switch being to the fingers 21 and $21^a$, respectively. Finger 21 is connected to finger 20 and finger $21^a$ to finger $20^a$. Fingers 22 and $22^a$ are connected in multiple with the blow-out coil B o C, which is connected with the trolley or supply side of the main circuit. L is a lead grounded as indicated and to which resistance-boxes R and R' are connected. The first group of contacts of each drum C' $C^2$ is grounded on the shaft thereof.

From the above description of the connections it will be seen that the drum C' controls motors M' and $M^3$, while the drum $C^2$ controls the motors $M^2$ and $M^4$, and that the two drums are electrically connected in multiple.

The operation is as follows: Starting from a position of rest, with the controller-drums in their first positions, the current from the trolley passes through the blow-out coil and to the fingers 22 $22^a$ of the drums in multiple. Inasmuch as the circuit through the contacts of one drum is substantially the same as the circuit through the other drum and its two motors in all except a few positions, it will be sufficient except as to those positions to trace one circuit. From the finger 22 the circuit is through contacts $c^{26}$ and $c^{25}$, finger 21 to finger 23 of the reversing-switch, contacts $x$ $x^2$, finger 25, to and through armature A', finger 24 to finger 26, to finger 18, contacts $c^{18}$ $c^{20}$, finger 19, finger 31, contacts $z^8$ $z^{10}$, finger 33, to and through armature $A^3$ to finger 32, contacts $z^9$ $z^{11}$, finger 34, finger 16, contacts $c^{11}$ $c^{15}$, finger 17, field F', finger 14, contacts $c^7$ $c^9$, finger 15, field $F^3$, through resistance-box R to ground. In this position, therefore, the current passes through each pair of motors and the resistance-box therefor in series. In position 2 the circuit is the same, except that finger 10 engages contact $c$, and thereby short-circuits a portion of the resistance, and in position 3 the engagement of finger 11 with contact $c'$ short-circuits a further section of the resistance. In position 4 the engagement of the finger 12 with the contact $c^2$ short-circuits the entire resistance. In position 4' the only change which is effected is that the finger 15 bridges the contacts $c^9$ and $c^{12}$, and thereby short-circuits the field F', a similar short-circuit of field $F^2$ taking place by the bridging of the fingers $15^a$ and its corresponding contacts. In position $4^2$ the fingers 14 and 15 lose their engagement with contacts $c^7$ and $c^9$, thereby cutting out the field F'. Positions 4' and $4^2$ are not notch or running positions, but occur momentarily in passing from notch position 4 to notch position 5. In position 5 finger 13 engages the contact $c^5$, and the circuit is through the two fields in multiple, the armature connections and circuits remaining as before. A similar multiple connection of the fields $F^2$ $F^4$ is of course effected. In position 5' the connections controlled by the drum C' remain the same as in position 5; but owing to the fact that the contacts $c^{11}$, $c^{12}$, $c^{18}$, $c^{20}$, $c^{25}$, and $c^{26}$ of the drum $C^2$ are shorter than the corresponding contacts of the drum C', as above described, the circuit is entirely opened through the motors $M^2$ $M^4$. (See position 5' of Fig. 2; also, Fig. 3.) At position $5^2$ the connections controlled by drum C' still remain the same as at position 5; but on the drum $C^2$ the fingers $14^a$, $15^a$, $16^a$, $17^a$, $18^a$, $19^a$, $20^a$, $21^a$, and $22^a$ engage, respectively, the contacts $c^8$, $c^{10}$, $c^{16}$, $c^{17}$, $c^{19}$, $c^{21}$, $c^{23}$, $c^{27}$, and $c^{28}$, thereby restoring the series connection of the fields $F^2$ $F^4$ and connecting the armatures $A^2$ $A^4$ in multiple. The circuit through the motors $M_2$ $M^4$ is therefore as follows: to finger $22^a$, to contacts $c^{28}$ $c^{27}$, and finger $21^a$. Here the current divides, one part passing from finger $21^a$ to finger 27 of the reversing-switch, contacts $z^4 z^6$, finger 29, armature $A^2$, finger 28, contacts $z^5$ $z^7$, finger 30, finger $18^a$, contacts $c^{19}$ $c^{17}$, finger $17^a$, field $F^2$, finger $14^a$, contacts $c^8$ $c^{10}$, finger $15^a$, field $F^4$, finger $12^a$, contact $c^3$, to ground. The other part of the current passes from finger $21^a$ to finger $20^a$, contacts $c^{23}$ $c^{21}$, finger $19^a$, finger 35 of the reversing-switch, contacts $z^{12}$ $z^{14}$, finger 37, armature $A^4$, finger 36, contacts $z^{13}$ $z^{15}$, finger 38 to finger $16^a$, contact $c^{16}$ to contact $c^{17}$, where its path unites with that of the first branch described. At position $5^3$ the connections controlled by drum $C^2$ remain as in position $5^2$; but the fingers of the drum $C'$ entirely lose engagement with the contacts of the drum $C'$, and thereby open the circuit through the motors $M'$ and $M^3$. (See position $5^3$, Fig. 2; also, Fig. 5.) When position 6 is reached, the connections controlled by drum $C^2$ remain the same as in position $5^2$, but the fingers 12 and 14 to 22, inclusive, of the drum $C'$ are engaged, respectively, with the contacts $c^3$, $c^8$, $c^{10}$, $c^{16}$, $c^{17}$, $c^{19}$, $c^{21}$, $c^{23}$, $c^{27}$, and $c^{28}$. This restores the series connection of the fields $F'$ $F^3$ and connects the armatures $A'$ $A^3$ in multiple, the circuit being similar to that traced in position $5^2$—that is to say, the current divides between fingers 21 and 20, one part passing by way of finger 21 and the reversing-switch to and through armature $A'$, thence back through said switch to the finger 18 and contacts $c^{19}$ $c^{17}$, while the other part passes by way of finger 20 contacts $c^{21}$ $c^{23}$, finger 19, and the reversing-switch, through armature $A^3$, thence back through said switch to finger 16, to contacts $c^{16}$ $c^{17}$, where the two paths unite, and the current passes in series through fields $F'$ $F^3$ by way of finger $c^{15}$, field $F'$, finger 14, contacts $c^8$ $c^{10}$, finger 15, field $F^3$, finger 12, and contact $c^3$ to ground. Positions $5'$, $5^2$, and $5^3$ are not notch positions; but position 6 is a notch position. In position $6'$ the fingers 16, 20, and 21 and $16^a$, $20^a$, and $21^a$ have lost engagement with the respective contacts $c^{16}$, $c^{21}$, and $c^{23}$, which breaks the circuits to armatures $A^2$ and $A^4$, the other connections remaining as in position 6. At position $6^2$ fingers 13 and $13^a$ engage their respective contacts $c^6$, and thereby short-circuit the fields $A^3$ and $A^4$. At position $6^3$ the fingers 14 and 15 and $14^a$ $15^a$ leave the contacts $c^8$ $c^{10}$, and thereby cut out the fields $A^3$ $A^4$. Positions $6'$, $6^2$, and $6^3$ are not notch positions. The elements of the motors are now in condition for connection in full multiple, and this is effected at position 7 by the engagement of the contacts $c^4$, $c^{13}$, $c^{14}$, $c^{32}$, and $c^{24}$ by the corresponding fingers of each drum. Without tracing out the circuits in full at this time it will be readily seen that the current at each drum will divide between the fingers 19 and 21 or $19^a$ and $21^a$, one part going through the reversing-switch by a path similar to that before traced through armature $A'$ or $A^2$, thence back to finger 18 or $18^a$, contacts $c^{19}$ $c^{17}$, finger 17 or $17^a$, field $F'$ or $F^2$, contact $c^6$, to ground, and the other part through the reversing-switch, armature $A^3$ or $A^4$, back to finger 16 or $16^a$, to contacts $c^{14}$ $c^{13}$, finger 15 or $15^a$, to field $F^3$ or $F^4$, to finger 13 or $13^a$, to contact $c^4$, to ground.

From the foregoing description it will be seen that while as to some of its broad features my method of control is similar to the method and involves some of the steps described and claimed in the patents to Wells R. Hamlen, Nos. 645,088 and 645,089, and Frank A. Merrick, Nos. 645,116 and 645,117, it provides for the first time, in so far as I am aware, a system of series-parallel control for a plurality of motors in which artificial resistance is not employed after the series position and in which at no time are all the motors cut out of circuit. I do not wish, therefore, to be limited to the use of the particular apparatus which I have shown, as various types of controllers might be devised to carry out my said method, nor do I wish to be limited to the particular combination of steps which I have herein illustrated and described, since it is obvious that the feature of effecting certain circuit changes in one pair of motors while the circuit in the other pair or pairs is kept intact may be applied with advantage in connection with systems of control which as a whole differ from that herein described.

Having thus described my invention, what I claim, and desire to secure by Letters Patent, is—

1. The method of controlling a plurality of electric motors arranged in groups, which consists in effecting certain circuit changes in one group of motors whereby the relations of the motors or motor elements in that group are changed with respect to each other and during such changes keeping the circuit through the other group or groups unbroken.

2. The method of controlling a plurality of electric motors arranged in groups by gradually changing the motors of each group from series to parallel relation through a series of steps, some of which are effected in one group of motors in advance of the corresponding changes in the other group or groups and while the latter are actively in circuit.

3. The method of controlling a plurality of motors connected in parallel groups, which consists in changing the motors of each group from series to parallel relation by circuit changes therein, some of which are effected in one group before they are effected in the other group or groups and without opening the circuit of the latter.

4. The method of controlling a plurality of electric motors which consists in starting them from a position of rest with their fields and armatures connected in series, then connecting their fields in multiple, then connecting their armatures in multiple and their fields in series, and finally connecting the motors as a whole in multiple, those circuit changes which effect the multiple connections of the armatures alone being effected in some of the motors in advance of such changes in the remaining motors and without opening the circuit therethrough.

5. The method of controlling a plurality of electric motors in groups or pairs connected in multiple with each other, which consists in starting them from a position of rest with the armatures and field-coils of each group or pair connected in series, then connecting the fields in multiple, then connecting the armatures in multiple and the fields in series, and finally connecting the motors of each pair or group in multiple, the multiple connection of the armatures alone being effected in one group or pair in advance of the other group or groups and without opening the circuit of the latter.

6. In a series-parallel system of control for a plurality of electric motors, the method of connecting their armatures in multiple which consists in first breaking the circuit through some of the motors while maintaining a circuit through the remaining motors, then connecting the armatures of the first-named motors in multiple and reconnecting them in circuit, and then effecting like changes in the remaining motors.

7. In a series-parallel system of control for a plurality of electric motors, the method of connecting the armatures in multiple which consists in first connecting the armatures of one group or pair in multiple without breaking the circuit through the remaining motors, and then effecting a like connection in the remaining motors while maintaining a circuit through the first group or pair, substantially as described.

8. The method of controlling a plurality of electric motors connected in parallel groups, which consists in starting with the motors of each group connected in series, then connecting the field-coils of each group in parallel, then cutting out one group, and reconnecting them in circuit with their armatures in parallel and their fields in series, then making similar changes in the other group or groups, and finally connecting the motors of each group wholly in parallel with each other.

9. The method of controlling a plurality of electric motors connected in parallel groups, which consists in starting with the motors of each group connected in series, then connecting certain elements of the motors of each group in parallel with the remaining elements still in series, then by further changes in each group, connecting those elements in parallel which were before in series and those elements in series which were before in parallel, and finally connecting the motors of each group wholly in parallel.

10. The method of controlling a plurality of electric motors connected in parallel groups of two motors each, which consists in first removing the field-coils of one motor of each group and reconnecting them in parallel with the field-coils of the other motor of the group, then cutting out each group successively, and reconnecting it in circuit with its armatures in parallel and its field-coil in series, and then connecting the motors of each group wholly in parallel with each other.

In testimony whereof I have affixed my signature in presence of two witnesses.

FRANK W. GARRETT.

Witnesses:
R. M. EVANS,
BLANCHE M. SMITH.